United States Patent
Liu et al.

(10) Patent No.: US 9,208,584 B2
(45) Date of Patent: Dec. 8, 2015

(54) METHOD AND APPARATUS FOR DESCRIBING IMAGE

(71) Applicants: PEKING UNIVERSITY FOUNDER GROUP CO., LTD., Beijing (CN); BEIJING FOUNDER APABI TECHNOLOGY LTD., Beijing (CN); PEKING UNIVERSITY, Beijing (CN)

(72) Inventors: Yan Liu, Beijing (CN); Xiaoqing Lv, Beijing (CN); Jianbo Xu, Beijing (CN); Zhi Tang, Beijing (CN); Xiaoyu Cui, Beijing (CN)

(73) Assignees: PEKING UNIVERSITY FOUNDER GROUP CO., LTD., Beijing (CN); BEIJING FOUNDER APABI TECHNOLOGY LTD., Beijing (CN); PEKING UNIVERSITY, Beijing (CN)

( * ) Notice: Subject to any disclaimer, the term of this patent is extended or adjusted under 35 U.S.C. 154(b) by 51 days.

(21) Appl. No.: 14/092,621

(22) Filed: Nov. 27, 2013

(65) Prior Publication Data

US 2014/0334727 A1 Nov. 13, 2014

(30) Foreign Application Priority Data

May 8, 2013 (CN) .......................... 2013 1 0166191

(51) Int. Cl.
*G06K 9/00* (2006.01)
*G06T 11/00* (2006.01)
(52) U.S. Cl.
CPC .................... *G06T 11/001* (2013.01)

(58) Field of Classification Search
None
See application file for complete search history.

(56) References Cited

U.S. PATENT DOCUMENTS

| 6,650,777 | B1 * | 11/2003 | Jensen et al. | 382/203 |
| 7,362,900 | B2 * | 4/2008 | Urano et al. | 382/199 |
| 7,876,319 | B2 * | 1/2011 | Chiba | 345/419 |
| 2004/0223662 | A1 * | 11/2004 | Urano et al. | 382/299 |

OTHER PUBLICATIONS

Abdel-Hakim et al., "CSIFT: A SIFT Descriptor with Color Invariant Characteristics," Proc. IEEE Conf. Computer Vision and Pattern Recognition, pp. 1978-1983, 2006.*
Lowe, "Distinctive image features from scale-invariant keypoints," Int. J. Comput. Vision, 60(2):91-110, 2004.*

\* cited by examiner

*Primary Examiner* — Bhavesh Mehta
*Assistant Examiner* — Feng Niu
(74) *Attorney, Agent, or Firm* — Workman Nydegger

(57) ABSTRACT

A method and apparatus for describing an image are disclosed. The method for describing an image according to an embodiment of the invention includes: transforming an image from a BGR color space into a Gaussian derivative color model; and transforming the image from the Gaussian derivative color model into an optical reflection invariant color space, wherein the process of transforming the image from the Gaussian derivative color model into the optical reflection invariant color space includes: determining, for each pixel on the image, color channels of the pixel corresponding to the optical reflection invariant color space according to a first coefficient and a second coefficient of the pixel in the Gaussian derivative color model. The embodiments of the invention can alleviate an error in a description of an image of the same contents but with a significant change in color.

8 Claims, 4 Drawing Sheets

METHOD AND APPARATUS FOR DESCRIBING IMAGE

CROSS-REFERENCE TO RELATED APPLICATIONS

The present application claims priority to Chinese Patent Application No. 201310166191.4 filed with the Chinese Patent Office on May 8, 2013 and entitled "method and apparatus for describing image", which is hereby incorporated by reference in its entirety.

FIELD OF THE INVENTION

The present invention relates to the field of digital image processing and particularly to a method and apparatus for describing an image.

BACKGROUND OF THE INVENTION

Methods of describing a feature of an image have been widely applied in the fields of image retrieval, image merging, object detection and identification, robot scenario positioning and an analysis of video contents, and a method for describing a local feature of an image is significantly advantageous over the rest of the methods of describing a feature of an image because it is robust against a complex background and an obscured environment and it requires no object segmentation.

At present Scale Invariant Feature Transform (SIFT) has been a feature description algorithm with high robustness commonly accepted in the art, and also numerous improved SIFT-based algorithms have emerged, for example, algorithms of Principle Component Analysis (PCA)-SIFT, Colored SIFT (CSIFT), Gradient Location Orientation Histogram (GLOH) and Speeded Up Robust Features (SURF) have achieved a good effect, and an analysis of focuses of researches on these algorithms shows that numerous researchers have focused their researches upon improved robustness of the algorithms, particularly including geometrical invariability, color invariability and affine invariability.

However all of the improved algorithms are SIFT-based, so they have a drawback in a description of an image sensitive to a change in color of the image that the improved SIFT-based methods are performed based on a grayscale image without sufficiently taking color information into account, and there are some objects with some approximate local features of their grayscale images, so these pixels may be matched in error in these methods represented by SIFT.

In summary, the existing SIFT-based methods of describing a feature of an image are performed based on a grayscale image, but a change in color of the image may impose a great influence upon the grayscale value of the image, so there may be a considerable error in a description of the image of the same contents but with a significant change in color.

SUMMARY OF THE INVENTION

Embodiments of the invention provide a method and apparatus for describing an image so as to alleviate an error in a description of an image of the same contents but with a significant change in color.

An embodiment of the invention provides a method for describing an image, the method including:

transforming an image from a blue green red (BGR) color space into a Gaussian derivative color model; and transforming the image from the Gaussian derivative color model into an optical reflection invariant color space, wherein the process of transforming the image from the Gaussian derivative color model into the optical reflection invariant color space includes: determining, for each pixel on the image, color channels of the pixel corresponding to the optical reflection invariant color space according to a first coefficient and a second coefficient of the pixel in the Gaussian derivative color model.

An embodiment of the invention provides an apparatus for describing an image, the apparatus including:

a first transforming unit configured to transform an image from a BGR color space into a Gaussian derivative color model; and a second transforming unit configured to transform the image from the Gaussian derivative color model into an optical reflection invariant color space, wherein the process of transforming the image from the Gaussian derivative color model into the optical reflection invariant color space is performed as follows: for each pixel on the image, color channels of the pixel corresponding to the optical reflection invariant color space are determined according to a first coefficient and a second coefficient of the pixel in the Gaussian derivative color model.

In the embodiments of the invention, an image is transformed from a BGR color space into a Gaussian derivative color model, and the image is transformed from the Gaussian derivative color model into an optical reflection invariant color space, thereby lowering an error in a description of the image of the same contents but with a significant change in color and further enabling a precise description of the image.

DETAILED DESCRIPTION OF THE EMBODIMENTS

In embodiments of the invention, an image is transformed from a BGR (blue green red) color space into a Gaussian derivative color model, and the image is transformed from the Gaussian derivative color model into an optical reflection invariant color space, thereby lowering an error in a description of the image of the same contents but with a significant change in color and further enabling a precise description of the image.

The embodiments of the invention will be further described below in details with reference to the drawings.

Figure 1:
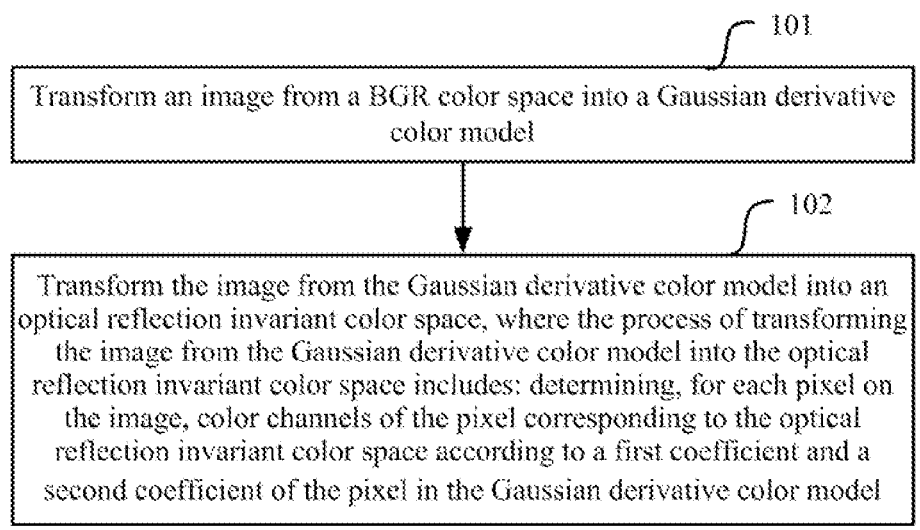
FIG. 1 is a schematic flow chart of a method for describing an image according to an embodiment of the invention.

As illustrated in FIG. 1, a method for describing an image according to an embodiment of the invention includes the following steps.

Step 101 is to transform an image from a BGR color space into a Gaussian derivative color model.

Step 102 is to transform the image from the Gaussian derivative color model into an optical reflection invariant color space.

Preferably in the step S102, the process of transforming the image from the Gaussian derivative color model into the optical reflection invariant color space is performed as follows:

For each pixel on the image, color channels of the pixel corresponding to the optical reflection invariant color space are determined according to a first coefficient and a second coefficient of the pixel in the Gaussian derivative color model.

Preferably the color channels of the pixel corresponding to the optical reflection invariant color space are determined in the formula of:

$$H^* = \alpha \frac{E_2}{E_1}, \quad \text{Formula 1}$$

where H* represents a color channel corresponding to the optical reflection invariant color space, α represents a constant preset as needed in practice, E1 represents the first coefficient of the pixel in the Gaussian derivative color model, and E2 represents the second coefficient of the pixel in the Gaussian derivative color model.

Preferably H* has an optical reflection characteristic independent of an angle, the direction of the surface of an object, the direction of a optical flow, brightness and a Fresnel reflectivity; and the use of the color invariant optical reflection coefficient H* as an optical reflection invariant color channel can obviate an error in matching the image due to a change in color.

Preferably α ranges from 255 to 1024.

Preferably α can be further configured to prevent a memory overflow from occurring in C++ programming Preferably the first coefficient E1 includes at least one of the value of the yellow-blue channel, the value of the red-green channel, and the value of strength; and the second coefficient E2 includes at least one of the value of the yellow-blue channel, the value of the red-green channel, and the value of strength.

In a particular implementation, the image can be transformed from the Gaussian derivative color model into the optical reflection invariant color space according to the color channels of the respective pixels on the image corresponding to the optical reflection invariant color space, that is, all the values of three color channels corresponding to each pixel of the image in the Gaussian derivative color model are replaced with H* corresponding to the pixel, and due to the equal replaced values of the color channels of each pixel, the three-channel image can be transformed into a single-channel image, and at this time the image has good optical reflection invariability, and the color space where the image is located is referred to as an optical reflection invariant color space.

An implementation in which the image is transformed from the Gaussian derivative color model into the optical reflection invariant color space according to the embodiment of the invention will be described below in details by way of an example in which the first coefficient E1 is the value of the yellow-blue channel, and the second coefficient E2 is the value of the red-green channel.

Step S1 is to determine the value of the yellow-blue channel and the value of the red-green channel of each pixel on the image when the Gaussian derivative color model has a central wavelength equal to a first preset value and a scale equal to a second preset value.

Step S2 is to determine the color channels corresponding to the optical reflection invariant color space according to the determined value of the yellow-blue channel and value of the red-green channel of each pixel on the image in the Gaussian derivative color model.

Step S3 is to transform the input image from the Gaussian derivative color model into the optical reflection invariant color space according to the color channels corresponding to the optical reflection invariant color space.

Preferably the value of the yellow-blue channel in the step S1 can be determined in Formula 2, and the value of the red-green channel in the step S1 can be determined in Formula 3.

$$E_\lambda = i(\vec{x}) \frac{\partial R_\infty(\lambda, \vec{x})}{\partial \lambda}; \quad \text{Formula 2}$$

and $$E_{\lambda\lambda} = i(\vec{x}) \frac{\partial^2 R_\infty(\lambda, \vec{x})}{\partial \lambda^2}, \quad \text{Formula 3}$$

where $E_{\lambda\lambda}$ represents the value of the red-green channel of the pixel in the Gaussian derivative color model, $E_\lambda$ represents the value of the yellow-blue channel of the pixel in the Gaussian derivative color model, $R_\infty(\lambda, \vec{x})$ represents the reflectivity of a material, λ represents a wavelength, and $i(\vec{x})$ represents a change in brightness.

Preferably Formula 2 and Formula 3 above are derived as follows.

The optical reflection model of the Kubelka-Munk Theory is:

$$E(\lambda,x,y) = e(\lambda,x,y)(1-\rho_f(x,y))R_\infty(\lambda,x,y) + e(\lambda,x,y)\rho_f(x,y),$$

where λ represents a wavelength, (x,y) represents the position of the pixel in the image, e(λ,x,y) represents a pixel spectrum, $\rho_f(x,y)$ represents a Fresnel reflectivity at (x,y), and $R_\infty(\lambda,x,y)$ represents the reflectivity of a material, where the influence of the Fresnel reflectivity upon a non-smooth and obscured surface can be negligible, that is, $\rho_f(x,y) \approx 0$. Thus the optical reflection model can be simplified as:

$$E(\lambda,x,y) = e(\lambda,x,y)R_\infty(\lambda,x,y),$$

The simplified optical reflection model can be partially differentiated with respect to λ to thereby derive Formula 2 and Formula 3.

In an implementation, the first preset value and the second preset value can be preset as needed. Then the preset first preset value and second preset value can substituted respectively into Formula 2 and Formula 3 to derive the value of the yellow-blue channel and the value of the red-green channel of the pixel on the image when the Gaussian derivative color model has a central wavelength equal to the first preset value and a scale equal to the second preset value.

Preferably with the central wavelength of $\lambda_0 = 520$ nm and the scale of $\sigma_\lambda = 55$ nm, the three channels of the pixel in the Gaussian derivative color model, including the brightness channel, the yellow-blue channel and the red-green channel, are similar to the XYZ bases of the color space CIE1964 and approximate the human visual system.

And with the central wavelength of $\lambda_0=520$ nm and the scale of $\sigma_\lambda=55$ nm, the value of the yellow-blue channel and the value of the red-green channel of the pixel in the Gaussian derivative color model can be determined as follows in addition to the foregoing determination.

The BGR color space can be reversibly linearly transformed twice into the Gaussian derivative color model, particularly as depicted in the following three formulas:

$$\begin{bmatrix} \hat{X} \\ \hat{Y}_\lambda \\ \hat{Z}_{\lambda\lambda} \end{bmatrix} = \begin{pmatrix} 0.62 & 0.11 & 0.19 \\ 0.3 & 0.56 & -0.05 \\ 0.01 & -0.03 & 1.11 \end{pmatrix} \begin{bmatrix} R \\ G \\ B \end{bmatrix},$$

$$\begin{bmatrix} \hat{E} \\ \hat{E}_\lambda \\ \hat{E}_{\lambda\lambda} \end{bmatrix} = \begin{pmatrix} -0.48 & 1.2 & 0.28 \\ 0.48 & 0 & -0.4 \\ -0.01 & 0.03 & 1.11 \end{pmatrix} \begin{bmatrix} \hat{X} \\ \hat{Y} \\ \hat{Z} \end{bmatrix}, \text{ and}$$

$$\begin{bmatrix} \hat{E} \\ \hat{E}_\lambda \\ \hat{E}_{\lambda\lambda} \end{bmatrix} = \begin{pmatrix} 0.06 & 0.63 & 0.27 \\ 0.3 & 0.04 & -0.35 \\ 0.34 & -0.6 & 0.17 \end{pmatrix} \begin{bmatrix} R \\ G \\ B \end{bmatrix}.$$

Preferably with the central wavelength of $\lambda_0=520$ nm and the scale of $\sigma_\lambda=55$ nm, $\hat{E}_\lambda$ an be determined to approximately $E_\lambda$, and $\hat{E}_{\lambda\lambda}$ can be determined to approximately $E_{\lambda\lambda}$, that is, $\hat{E}_{\lambda\lambda}$ represents the value of the red-green channel of the pixel in the Gaussian derivative color model, and $\hat{E}_\lambda$ represents the value of the yellow-blue channel of the pixel in the Gaussian derivative color mode.

Preferably in the step S2, the color channels corresponding to the optical reflection invariant color space can be determined in Formula 4 of:

$$H^* = \alpha \frac{E_{\lambda\lambda}}{E_\lambda}, \qquad \text{Formula 4}$$

where $E_{\lambda\lambda}$ represents the value of the red-green channel of the pixel in the Gaussian derivative color model, and $E_\lambda$ represents the value of the yellow-blue channel of the pixel in the Gaussian derivative color mode.

Preferably after the step 102, the method further includes the following steps.

Step Q1 is to build a Laplacian of Gaussian (LoG) pyramid for the image in the optical reflection invariant color space and to transform the LOG pyramid into a Difference of Gaussian (DoG) pyramid.

Step Q2 is to determine a plurality of local extremes according to the DOG pyramid, where each of the local extremes includes a first local extreme in the scale direction, a second local extreme in the X direction and a third local extreme in the Y direction.

Step Q3 is to determine for each local extreme a key pixel according to the first local extreme, the second local extreme and the third local extreme of the local extreme.

Preferably the image further needs to be processed into an initial image for building the LOG pyramid before the LOG pyramid is built in the optical reflection invariant color space.

The following description will be given taking 5 images per set (octv) of the LOG pyramid as an example, although the number of images per set can be preset as needed.

Specifically, in order to scale up an image by a factor of 2, three linear interpolation processes are performed on the image, and the image scaled up by the factor of 2 is taken as the zero-th image.

Four Gaussian filtering processes are performed on the linearly interpolated image to obtain the first, second, third and fourth images respectively.

The zero-th, first, second, third and fourth images are down-sampled by a factor of ½ into a next set of 5 images; and the down-sampling process is repeated for a number N of times to obtain corresponding N sets octv of 5 images, where:

$$N=\log(\text{MIN}(\text{src}\rightarrow\text{width},\text{src}\rightarrow\text{height}))/\log(a)-a,$$

where MIN represents a minimum taking operation, src→width and src→height represent the width and the height of the image resulting from interpolation on the input image respectively, and a is a constant preset as needed in practice.

Preferably a is 2.

Preferably in the step Q1, the LoG pyramid is built for the image in the optical reflection invariant color space is performed as follows:

The obtained (N+2) sets of 5 images are arranged in the form of a pyramid, where each set of images constitutes a layer of the LoG pyramid.

Preferably in the step Q1, the LoG pyramid is transformed into the DoG pyramid is performed as follows:

Difference operations are performed on the 5 images in each set of the LoG pyramid, that is, a difference operation is performed on every two adjacent images among the 5 images in each set to obtain 4 images per set, and the obtained (N+2) sets of 4 images are arranged in the form of a pyramid, where each set of images constitutes a layer of the DoG pyramid.

Preferably in the step Q2, the plurality of local extremes are determined according to the DoG pyramid as follows:

In the same set (octv) of the DoG pyramid, all the pixels in each image in the same set (octv) are determined in an order that they are stored, and each current pixel in an image is compared in scale respectively with pixels in the neighborhood of the pixel and with pixels in the neighborhoods of pixels, in two upper and lower images adjacent to the image, corresponding to the pixel; and Since the value of a pixel in the image of the DoG pyramid is a floating-point number ranging from −255 to +255, if the value of the current pixel is above 0, then the value of the current pixel is determined as a local maximum when the value of the current pixel is above all the values of the pixels in the neighborhood and the pixels in the neighborhoods of the corresponding pixels in the two adjacent upper and lower images; and if the value of the current pixel is below 0, then the value of the current pixel is determined as a local minimum when the value of the pixel is below all the values of the pixels in the neighborhood and the pixels in the neighborhoods of the corresponding pixels in the two adjacent upper and lower images, where the top image and the bottom image in the same set (octv) will be precluded from calculation of local extremes due to the absence of two adjacent upper and lower images.

Preferably in the step Q3, the key pixel is determined as follows:

The determined local extremes corresponding to the DoG pyramid are marked as candidate key pixels, and the candidate key pixels with a too low magnitude and at an edge are filtered out, leaving the key pixel.

Preferably the candidate key pixels with a too low magnitude are filtered out as follows:

A candidate key pixel is filtered out if the absolute value of an eigenvector corresponding to the candidate key pixel is below a first threshold (e.g., 0.03).

Preferably the candidate key pixels at an edge are filtered out as follows:

A Hessian matrix is solved for a candidate key pixel, and a high major curvature of the candidate key pixel is determined and the candidate key pixel is filtered out if the ratio of the trace to the determinant of the matrix is below a second threshold (e.g., 10).

Preferably there are a larger number of key pixels determined and more uniformly distributed in the optical reflection invariant color space.

Preferably after the step Q3, the method further includes the following steps.

Step B1 is to determine for each key pixel a gradient description range corresponding to the key pixel according to the first local extreme of the key pixel.

Step B2 is to determine an eigenvector corresponding to the key pixel according to the gradient description range.

Preferably in the step B1, for a key pixel, the gradient description range corresponding to the key pixel is a circular area centered at the key pixel.

Preferably the gradient description range corresponding to the key pixel is a circular area centered at the key pixel, and for each key pixel, the radius of the gradient description range corresponding to the key pixel is determined as follows:

The radius of the gradient description range corresponding to the key pixel is determined in the formula of:

$$R = \alpha_1 \sigma \times Y^{1/N} + 1/Y \quad \text{Formula 5,}$$

where R represents the radius of the gradient description range corresponding to the key pixel, $\alpha_1$ represents a constant preset as needed in practice, $\sigma$ represents the first local extreme of the key pixel, N represents the number of images at the same scale, in the DoG pyramid, in the set corresponding to the key pixel, and Y represents a constant preset as needed in practice.

Preferably in the step B2, the eigenvector corresponding to the key pixel is determined according to the gradient description range as follows.

Step C1 is to determine for each pixel in the gradient description range two-dimension coordinate axes corresponding to the pixel according to the relative position of the pixel to the key pixel.

Figure 3:
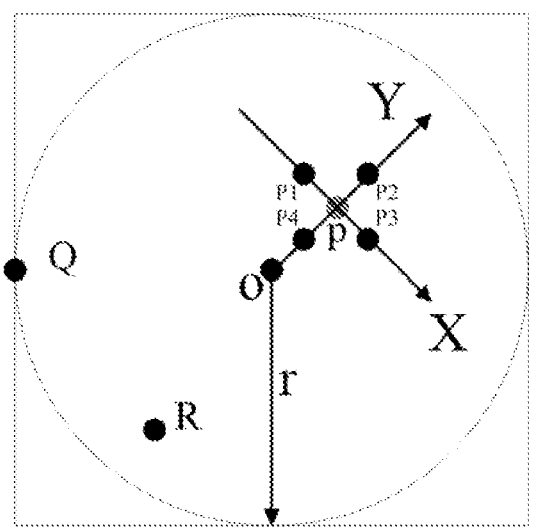
FIG. 3 is a schematic diagram of a method for determining a gradient direction and a gradient magnitude of each pixel corresponding to a key pixel according to an embodiment of the invention.

Taking FIG. 3 as an example, the O pixel represents the key pixel, and the P pixel represents the pixel, and two-dimension coordinate axes corresponding to the pixel are determined according to the relative position OP of the pixel P to the key pixel O as including the Y axis which is the straight line where the OP lies and the X axis which is the straight line perpendicular to the Y axis and through the P pixel or the X axis which is the straight line where the OP lies and the Y axis which is the straight line perpendicular to the X axis and through the P pixel, where the directions of the X axis and the Y axis can be preset as needed; and in FIG. 3, the Y axis is the straight line where the OP lies, the X axis is the straight line perpendicular to the Y axis and through the P pixel, the direction of the Y axis is the direction in which the OP extends positively, and the direction of the X axis is the direction in which $PP_3$ extends positively.

Step C2 is to determine a plurality of adjacent pixels corresponding to the pixel according to the two-dimension coordinate axes.

Step C3 is to determine the gradient direction and the gradient magnitude of the pixel according to the pixel values of the respective adjacent pixels.

Step C4 is to determine the eigenvector of the key pixel according to the gradient directions and the gradient magnitudes of the respective pixels corresponding to the key pixel.

In a particular implementation, for an implementation in which the pixels in the gradient description range are determined, since the gradient description range corresponding to the key pixel is a circular area centered at the key pixel, pixels located on the circle can be set as the pixels in the gradient description range or as pixels beyond the gradient description range.

Taking FIG. 3 as an example, the O pixel is the key pixel, the gradient description range corresponding to the O pixel is the range of a circular area centered at the O pixel and with a radius of r, and the P pixel, the Q pixel and the R pixel represent pixels, where the pixel P and the pixel R are located in the circular area centered at the key pixel O and with the radius of r, and the pixel Q is located on the circle centered at the key pixel O and with the radius of r; and the P pixel and the R pixel are pixels in the gradient description range, and the pixel Q can be regarded as a pixel in the gradient description range or a pixel beyond the gradient description range.

Preferably in the step C2, for each pixel in the gradient description range, the adjacent pixels corresponding to the pixel are located on the two-dimension coordinate axes corresponding to the pixel, and the distances between the adjacent pixels and the pixel are no more than one pixel.

In an implementation, all the adjacent pixels shall be located on the coordinate axes, thereby obviate the problem of an influence upon the eigenvector due to a change in direction arising from the rotation of the object.

Taking FIG. 3 as an example, the adjacent pixels $P_1$, $P_2$, $P_3$ and $P_4$ corresponding to the pixel P are located respectively on the negative X axis, the positive Y axis, the positive X axis and the negative Y axis, and all the distances between $P_1$, $P_2$, $P_3$ and $P_4$ and the pixel P are one pixel.

Taking FIG. 3 as an example below, determination of the gradient direction and the gradient magnitude of the pixel according to the pixel values of the respective adjacent pixels in the step C3 will be introduced below.

In FIG. 3, $P_1$, $P_2$, $P_3$ and $P_4$ are adjacent pixels corresponding to the pixel P, $f(P_1)$ represents the pixel value of the pixel $P_1$, $f(P_2)$ represents the pixel value of the pixel $P_2$, $f(P_3)$ represents the pixel value of the pixel $P_3$, and $f(P_4)$ represents the pixel value of the pixel $P_4$, and a tan 2 represents an inverse tangent, and the gradient direction and the gradient magnitude of the pixel P can be determined in the following two formulas of:

$$G(P) = \sqrt{[f(P_2)-f(P_4)]^2 + [f(P_3)-f(P_1)]^2}, \text{ and}$$

$$\theta(P) = a\tan 2[f(P_2)-f(P_4), f(P_3)-f(P_1)],$$

where G(P) represents the gradient magnitude of the pixel P, and θ(P) represents the gradient direction of the pixel P.

It shall be noted that determination of the gradient direction and the gradient magnitude of the pixel according to the pixel values of the respective adjacent pixels according to the embodiment of the invention has been introduced above taking the 4 adjacent pixels corresponding to the pixel as an example, but a particular implementation with respect to the pixel corresponding to another number of adjacent pixels will be similar to the implementation with respect to the pixel corresponding to the 4 adjacent pixels according to the embodiment of the invention.

Preferably in the step C4, the eigenvector of the key pixel is determined according to the gradient directions and the gradient magnitudes of the respective pixels corresponding to the key pixel as follows:

all the pixels in the gradient description range are divided into a plurality of groups according to the gradient directions corresponding to the respective pixels; the gradient magnitudes of the pixels in the gradient directions belonging to the same group are summed up into a quantity corresponding to the group; and the eigenvector of the key pixel is determined according to the quantities corresponding to the respective groups; or all the pixels in the gradient description range are divided into a plurality of groups according to the gradient directions corresponding to the respective pixels; the number of the pixels in the gradient directions belonging to the same group is counted up into a quantity corresponding to the group; and the eigenvector of the key pixel is determined according to the quantities corresponding to the respective groups.

Division of all the pixels into a plurality of groups according to the gradient directions corresponding to the respective pixels will be introduced below by way of a particular example.

Figure 4:
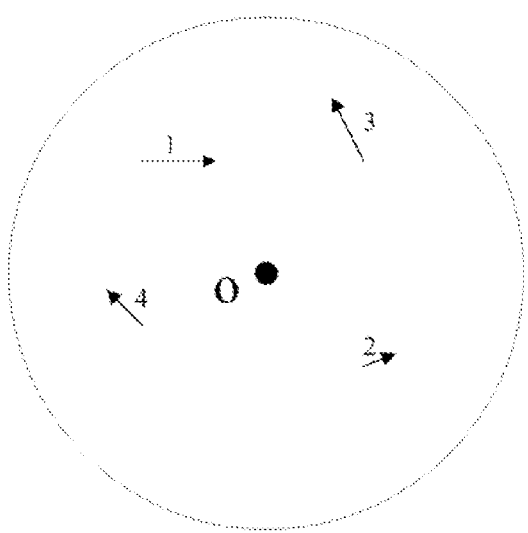
FIG. 4 is a schematic diagram of a gradient direction and a gradient magnitude of each pixel without dividing a gradient description range corresponding to a key pixel according to an embodiment of the invention.

Taking FIG. 4 as an example, as illustrated in FIG. 4, O represents the key pixel, and 1, 2, 3 and 4 represent arrows, where an arrow represents a pixel, the direction to which the arrow points represents the gradient direction of the pixel, and the length of the arrow represents the gradient magnitude of the pixel, and after 8 bins (directions) are determined to be included in the gradient description range, division of all the pixels in the gradient description range into 8 groups can be determined, and 360° can be divided by 8 to thereby determine a range of angles that can be accommodated in each of the 8 groups and further divide all the pixels in the gradient description range into the 8 groups according to the gradient directions of the pixels.

Specifically after 8 bins are determined to be included in the gradient description range, 8 groups into which all the pixels in the gradient description range are divided are determined respectively as A, B, C, D, E, F, G and H; and the quotient of 360° divided by 8 is 45° to thereby determine a range of angles that can be accommodated in the group A as 0° to 45°, a range of angles that can be accommodated in the group B as 45° to 90°, a range of angles that can be accommodated in the group C as 90° to 135°, a range of angles that can be accommodated in the group D as 135° to 180°, a range of angles that can be accommodated in the group E as 180° to 225°, a range of angles that can be accommodated in the group F as 225° to 270°, a range of angles that can be accommodated in the group G as 270° to 315°, and a range of angles that can be accommodated in the group H as 315° to 360°; and further all the pixels in the circular area can be divided into the 8 groups according to the gradient directions of the pixels, where the gradient direction of the pixel 1, i.e., the arrow 1, is $\theta=0°$, the gradient direction of the pixel 2 is $\theta=22.5°$, the gradient direction of the pixel 3 is $\theta=112.5°$, and the gradient direction of the pixel 4 is $\theta=135°$, so the gradient directions of the pixel 1 and the pixel 2 are in the range of angles that can be accommodated in the group A, and the gradient directions of the pixel 3 and the pixel 4 are in the range of angles that can be accommodated in the group C, and then the pixel 1 and the pixel 2 are allocated to the group A, and the pixel 3 and the pixel 4 are allocated to the group C.

Two methods for determining the eigenvector of the key pixel according to the gradient directions and the gradient magnitudes of the respective pixels corresponding to the key pixel will be introduced below respectively by way of an example.

In a first method, the gradient magnitudes of the pixels in the gradient directions belonging to the same group are summed up into a quantity corresponding to the group; and the eigenvector of the key pixel is determined according to the quantities corresponding to the respective groups.

Preferably the gradient magnitudes of the pixels in the gradient directions belonging to the same group are summed up into a quantity corresponding to the group and the eigenvector of the key pixel is determined according to the quantities corresponding to the respective groups as follows:

All the pixels are divided into N groups according to the gradient directions corresponding to the respective pixels; and For the N groups, the gradient magnitudes of all the pixels in each group are summed up, and accordingly N quantities are obtained and determined as the determined eigenvector of the key pixel, where N is a positive integer.

Figure 5:
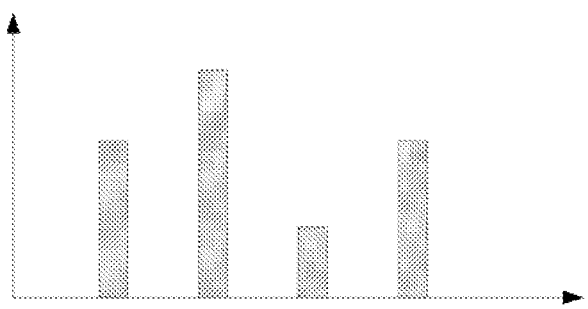
FIG. 5 is an eigenvector represented in the form of a histogram according to an embodiment of the invention.

Preferably as illustrated in FIG. 5, the obtained N quantities can be represented in the form of a histogram to thereby obtain an N-dimension direction histogram.

In a particular implementation, the key pixel and the gradient description range where the key pixel is located can be represented as the eigenvector corresponding to these N quantities.

Figure 6:
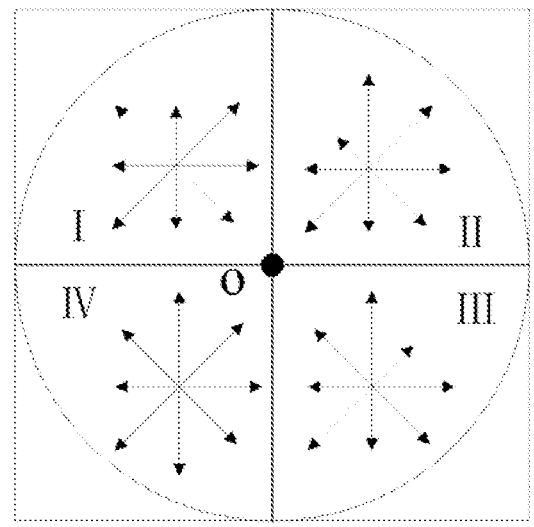
FIG. 6 is a schematic diagram of a gradient direction and a gradient magnitude of each pixel while dividing a gradient description range corresponding to a key pixel according to an embodiment of the invention.

In a particular implementation, the gradient description range, centered at the key pixel, including the respective pixels corresponding to the key pixel may not be divided into zones, but instead all the pixels in the gradient description range can be divided directly into the N groups according to the N bins included in the gradient description range; or the gradient description range can be divided into zones, and then the pixels in each zone can be divided into N groups according to the N bins included in the gradient description range. As illustrated in FIG. 6, the gradient description range is divided into 2*2 zones, i.e., four zones I, II, III and IV in total, and each zone is divided into 8 groups according to the gradient directions, and then 8 quantities can be obtained for each zone, and 32 quantities can be obtained for the key pixel and the gradient description range where the key pixel is located, so the key pixel and the gradient description range where the key pixel is located can be represented as an eigenvector corresponding to these 32 quantities.

In a particular implementation, the gradient description range can alternatively be divided into 3*3 zones, 4*4 zones or 5*5 zones particularly as needed in practice.

In a second method, the number of the pixels in the gradient directions belonging to the same group is counted up into a quantity corresponding to the group; and the eigenvector of the key pixel is determined according to the quantities corresponding to the respective groups.

In a particular implementation, the second method differs from the first method in that only the gradient directions of the pixels are determined without determining the gradient magnitudes and the number of pixels are counted up instead of summing up the gradient magnitudes.

In a particular implementation, the obtained N quantities can be represented in the form of a histogram, which is an eigenvector, to thereby obtain an N-dimension direction histogram, where N is a positive integer.

Figure 2:
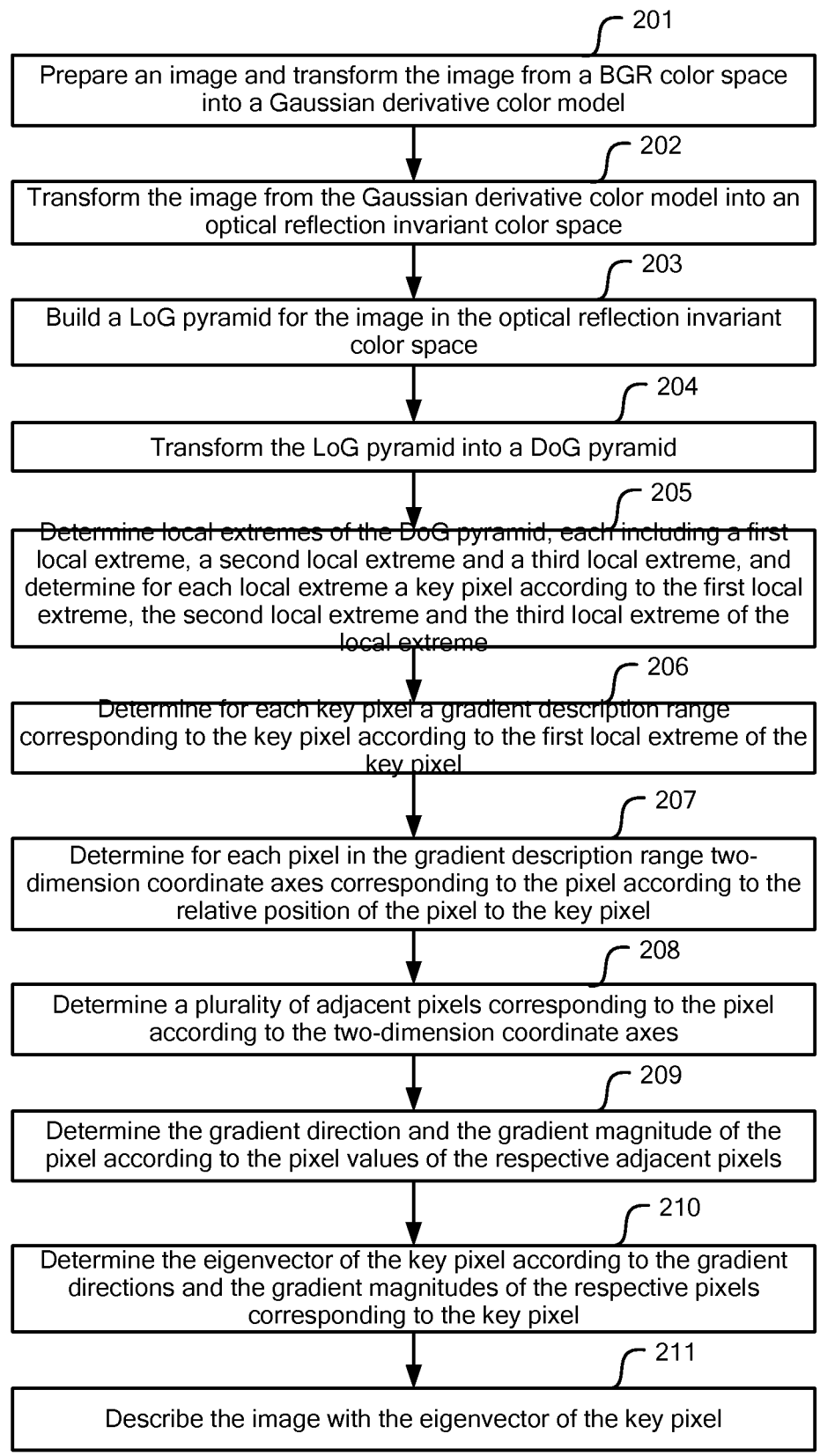
FIG. 2 is a schematic flow chart of a particular method for describing an image according to an embodiment of the invention.

As illustrated in FIG. 2, a particular method for describing an image according to an embodiment of the invention includes the following steps.

Step 201 is to prepare an image and to transform the image from a BGR color space into a Gaussian derivative color model.

Step 202 is to transform the image from the Gaussian derivative color model into an optical reflection invariant color space.

Step 203 is to build a LoG pyramid for the image in the optical reflection invariant color space.

Step 204 is to transform the LoG pyramid into a DoG pyramid.

Step 205 is to determine local extremes of the DoG pyramid, each including a first local extreme, a second local extreme and a third local extreme, and to determine for each local extreme a key pixel according to the first local extreme, the second local extreme and the third local extreme of the local extreme.

Step 206 is to determine for each key pixel a gradient description range corresponding to the key pixel according to the first local extreme of the key pixel.

Step 207 is to determine for each pixel in the gradient description range two-dimension coordinate axes corresponding to the pixel according to the relative position of the pixel to the key pixel.

Step 208 is to determine a plurality of adjacent pixels corresponding to the pixel according to the two-dimension coordinate axes.

Step 209 is to determine the gradient direction and the gradient magnitude of the pixel according to the pixel values of the respective adjacent pixels.

Step 210 is to determine an eigenvector of the key pixel according to the gradient directions and the gradient magnitudes of the respective pixels corresponding to the key pixel.

Step 211 is to describe the image with the eigenvector of the key pixel.

Based upon the same inventive idea, an embodiment of the invention further provides an apparatus for describing an image, and since the apparatus addresses the problem under a principle similar to the method according to the embodiments of the invention, reference can be made to the implementations of the method for an implementation of the apparatus, and a repeated description thereof can be omitted here.

Figure 7:
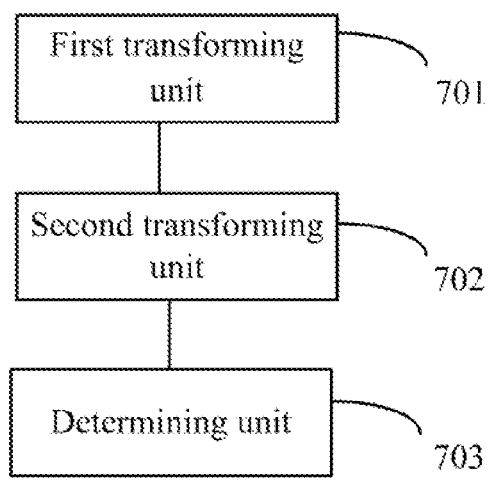
FIG. 7 is a schematic structural diagram of an apparatus for describing an image according to an embodiment of the invention.

FIG. 7 is a schematic structural diagram of an apparatus for describing an image according to an embodiment of the invention, and as illustrated in FIG. 7, the apparatus for describing an image according to the embodiment of the invention includes a first transforming unit 701 and a second transforming unit 702.

The first transforming unit 701 is configured to transform an image from a BGR color space into a Gaussian derivative color model.

The second transforming unit 702 is configured to transform the image from the Gaussian derivative color model into an optical reflection invariant color space.

Particularly the process of transforming the image from the Gaussian derivative color model into the optical reflection invariant color space is performed as follows: for each pixel on the image, color channels of the pixel corresponding to the optical reflection invariant color space are determined according to a first coefficient and a second coefficient of the pixel in the Gaussian derivative color model.

Preferably the first coefficient E1 includes at least one of the value of the yellow-blue channel, the value of the red-green channel, and the value of strength; and the second coefficient E2 includes at least one of the value of the yellow-blue channel, the value of the red-green channel, and the value of strength.

Preferably the second transforming unit is further configured to determine the color channels corresponding to the optical reflection invariant color space in Formula 1.

Preferably the apparatus for describing an image according to the embodiment of the invention further includes a determining unit 703 configured to build a Laplacian of Gaussian (LoG) pyramid for the image in the optical reflection invariant color space, to transform the LOG pyramid into a Difference of Gaussian (DoG) pyramid, to determine a plurality of local extremes according to the DOG pyramid, where each of the local extremes includes a first local extreme in the scale direction, a second local extreme in the X direction and a third local extreme in the Y direction, and to determine for each local extreme a key pixel according to the first local extreme, the second local extreme and the third local extreme of the local extreme.

Preferably the determining unit 703 is further configured to determine for each key pixel a gradient description range corresponding to the key pixel according to the first local extreme of the key pixel, and to determine an eigenvector corresponding to the key pixel according to the gradient description range.

Preferably the gradient description range corresponding to the key pixel is a circular area centered at the key pixel, and the determining unit 703 is further configured to determine the radius of the gradient description range corresponding to the key pixel in Formula 5.

Preferably the determining unit 703 is further configured to determine for each pixel in the gradient description range two-dimension coordinate axes corresponding to the pixel according to the relative position of the pixel to the key pixel, to determine a plurality of adjacent pixels corresponding to the pixel according to the two-dimension coordinate axes, to determine the gradient direction and the gradient magnitude of the pixel according to the pixel values of the respective adjacent pixels, and to determine the eigenvector of the key pixel according to the gradient directions and the gradient magnitudes of the respective pixels corresponding to the key pixel.

Preferably adjacent pixels corresponding to each pixel in the gradient description range are located on the two-dimension coordinate axes corresponding to the pixel, and the distances between the adjacent pixels and the pixel are no more than one pixel.

Preferably the determining unit 703 is further configured to divide all the pixels in the gradient description range into a plurality of groups according to the gradient directions of the respective pixels, to sum up the gradient magnitudes of the pixels in the gradient directions belonging to the same group into a quantity corresponding to the group, and to determine the eigenvector of the key pixel according to the quantities corresponding to the respective groups.

Preferably the determining unit 703 is further configured to divide all the pixels in the gradient description range into a plurality of groups according to the gradient directions of the respective pixels, to count up the number of the pixels in the gradient directions belonging to the same group into a quantity corresponding to the group, and to determine the eigenvector of the key pixel according to the quantities corresponding to the respective groups.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for describing an image, comprising:
transforming an image from a blue green red, BGR, color space into a Gaussian derivative color model; and
transforming the image from the Gaussian derivative color model into an optical reflection invariant color space,
wherein the process of transforming the image from the Gaussian derivative color model into the optical reflection invariant color space comprises: determining, for each of a plurality of pixels on the image, color channels of the each of the plurality of pixels corresponding to the optical reflection invariant color space according to a first coefficient and a second coefficient of the each of the plurality of pixels in the Gaussian derivative color model;
wherein after the image is transformed from the Gaussian derivative color model into the optical reflection invariant color space, the method further comprises:
building a Laplacian of Gaussian, LoG, pyramid for the image in the optical reflection invariant color space and transforming the LoG pyramid into a Difference of Gaussian, DoG, pyramid;
determining a plurality of local extremes according to the DoG pyramid, wherein each of the plurality of local extremes includes a first local extreme in the scale direction, a second local extreme in the X direction and a third local extreme in the Y direction; and
determining, for the each of the plurality of local extremes, a key pixel according to the first local extreme, the second local extreme and the third local extreme;
wherein after the key pixels for the plurality of local extremes are determined, the method further comprises:
determining, for each of the key pixels, a gradient description range corresponding to the each of the key pixels according to the first local extreme of the each of the key pixels; and
determining an eigenvector corresponding to the each of the key pixels according to the gradient description range;
wherein the gradient description range corresponding to each of the key pixels is a circular area centered at the each of the key pixels and includes another plurality of pixels, and the radius of the gradient description range corresponding to the each of the key pixels is determined in the formula of:

$R = \alpha_1 \times Y^{1/N} + 1/Y$, wherein R represents the radius of the gradient description range corresponding to the each of the key pixels, $\alpha_1$ represents a constant preset as needed in practice, $\sigma$ represents the first local extreme of each of the key pixels, N represents the number of images at the same scale, in the DoG pyramid, in a set corresponding to the each of the key pixels, and Y represents a constant preset as needed in practice.

2. The method according to claim 1, wherein the first coefficient E1 includes at least one of the value of the yellow-blue channel, the value of the red-green channel, and the value of strength; and the second coefficient E2 includes at least one of the value of the yellow-blue channel, the value of the red-green channel, and the value of strength.

3. The method according to claim 2, wherein the color channels corresponding to the optical reflection invariant color space are determined in the formula $$H^* = \alpha \frac{E_2}{E_1},$$

wherein H* represents a color channel corresponding to the optical reflection invariant color space, and α represents a constant preset as needed in practice.

4. The method according to claim 1, wherein the process of determining the eigenvector corresponding to each of the key pixels according to the gradient description range comprises:
determining for the each of the another plurality of pixels in the gradient description range two-dimension coordinate axes corresponding to the each of the another plurality of pixels in the gradient description range, according to the relative position of the each of the another plurality of pixels in the gradient description range to each of the key pixels;
determining a plurality of adjacent pixels corresponding to the each of the another plurality of pixels in the gradient description range according to the two-dimension coordinate axes;
determining the gradient direction and the gradient magnitude of the each of the another plurality of pixels in the gradient description range according to the pixel values of the plurality of adjacent pixels; and
determining the eigenvector of the each of the key pixels according to the gradient directions and the gradient magnitudes of the another plurality of pixels in the gradient description range corresponding to the each of the key pixels.

5. The method according to claim 4, wherein for the each of the another plurality of pixels in the gradient description range, the plurality of adjacent pixels corresponding to the each of the another plurality of pixels in the gradient description range are located on the two-dimension coordinate axes corresponding to the each of the another plurality of pixels in the gradient description range, and the distances between the plurality of adjacent pixels and the each of the another plurality of pixels in the gradient description range are no more than one pixel.

6. The method according to claim 5, wherein the process of determining the eigenvector of the each of the key pixels according to the gradient directions and the gradient magnitudes of the another plurality of pixels in the gradient description range corresponding to the each of the key pixels comprises:
dividing the another plurality of pixels in the gradient description range into a plurality of groups according to the gradient directions of the another plurality of pixels;
summing up the gradient magnitudes of the another plurality of pixels in the gradient directions belonging to the same group into a quantity corresponding to the group; and
determining the eigenvector of the each of the key pixels according to the quantities corresponding to the respective groups.

7. The method according to claim 5, wherein the process of determining the eigenvector of the each of the key pixels according to the gradient directions and the gradient magnitudes of the another plurality of pixels in the gradient description range corresponding to each of the key pixels comprises:
dividing the another plurality of pixels in the gradient description range into a plurality of groups according to the gradient directions of the another plurality of pixels in the gradient description range;
counting up the number of the another plurality of pixels in the gradient directions belonging to the same group into a quantity corresponding to the group; and
determining the eigenvector of the each of the key pixels according to the quantities corresponding to the respective groups.

8. An apparatus for describing an image, comprising:
a first transforming unit configured to transform an image from a blue green red, BGR, color space into a Gaussian derivative color model;
a second transforming unit configured to transform the image from the Gaussian derivative color model into an optical reflection invariant color space,
wherein the process of transforming the image from the Gaussian derivative color model into the optical reflection invariant color space is performed as follows: for each of a plurality of pixels on the image, color channels of the each of the plurality of pixels corresponding to the optical reflection invariant color space are determined according to a first coefficient and a second coefficient of the each of the plurality of pixels in the Gaussian derivative color model; and
a determining unit configured:
to build a Laplacian of Gaussian, LoG, pyramid for the image in the optical reflection invariant color space and transform the LoG pyramid into a Difference of Gaussian, DoG, pyramid;
to determine a plurality of local extremes according to the DoG pyramid, wherein each of the local extremes includes a first local extreme in the scale direction, a second local extreme in the X direction and a third local extreme in the Y direction;
to determine, for each of the plurality of local extremes, a key pixel according to the first local extreme, the second local extreme and the third local extreme;
to determine, for each of the key pixels, a gradient description range corresponding to the each of the key pixels according to the first local extreme of the each of the key pixels; and
to determine an eigenvector corresponding to the each of the key pixels according to the gradient description range;
wherein the gradient description range corresponding to the each of the key pixels is a circular area centered at each of the key pixels and includes a plurality of pixels, and the radius of the gradient description range corresponding to the each of the key pixels is determined in the formula of:

$$R = \alpha_1 \sigma \times Y^{1/N} + 1/Y,$$

wherein R represents the radius of the gradient description range corresponding to the each of the key pixels, $\alpha_1$ represents a constant preset as needed in practice, $\sigma$ represents the first local extreme of each of the key pixels, N represents the number of images at the same scale, in the DoG pyramid, in a set corresponding to the each of the key pixels, and Y represents a constant preset as needed in practice.

\* \* \* \* \*